United States Patent [19]
Dorman

[11] Patent Number: 5,836,635
[45] Date of Patent: Nov. 17, 1998

[54] KNOCKDOWN TRUCK RACK APPARATUS AND METHOD

[76] Inventor: John R. Dorman, 15908 18th Ave. Ct. East, Tacoma, Wash. 98445-3343

[21] Appl. No.: 656,578

[22] Filed: May 31, 1996

[51] Int. Cl.$^6$ ...................................................... B60F 3/00
[52] U.S. Cl. .............................................. 296/3; 224/405
[58] Field of Search ................... 296/3; 211/176, 211/205, 206; 224/403, 405

[56] References Cited

U.S. PATENT DOCUMENTS

| | | | |
|---|---|---|---|
| 244,268 | 5/1881 | Hinch | D12/157 |
| 3,594,035 | 7/1971 | Ferguson | 296/3 |
| 3,891,262 | 6/1975 | Brunel | 296/3 |
| 4,138,046 | 2/1979 | De Freze | 224/42.42 R |
| 4,152,020 | 5/1979 | Brown et al. | 296/3 |
| 4,199,186 | 4/1980 | Faverino | 296/13 |
| 4,278,175 | 7/1981 | Jackson | 211/41 |
| 4,405,170 | 9/1983 | Raya | 296/10 |
| 4,565,402 | 1/1986 | Hopkins | 296/3 |
| 4,770,450 | 9/1988 | Burke et al. | 296/3 |
| 5,110,021 | 5/1992 | Dawson, Jr. | 224/42.01 |
| 5,431,472 | 7/1995 | Coffland | 296/3 |
| 5,451,083 | 9/1995 | Tayar | 296/3 |
| 5,560,666 | 10/1996 | Vigira et al. | 296/3 |

*Primary Examiner*—Dennis H. Pedder
*Attorney, Agent, or Firm*—William G. Forster

[57] ABSTRACT

A removable knockdown truck rack having independent front and aft support frames. Each support frame having two spaced apart side-posts, each side-post being rigidly connected to a cross rail disposed therebetween thereby forming a moment resistant frame to resist lateral forces transverse to the truck. Each side-post of the frames being supported by a socket assembly adapted to be attached to the cargo bed of a truck. Each said socket assembly having a receiving socket disposed to securably receive a side-post therein. Wherein the receiving sockets are braced to resist longitudinal forces imparted substantially by acceleration and deceleration of the truck.

3 Claims, 4 Drawing Sheets

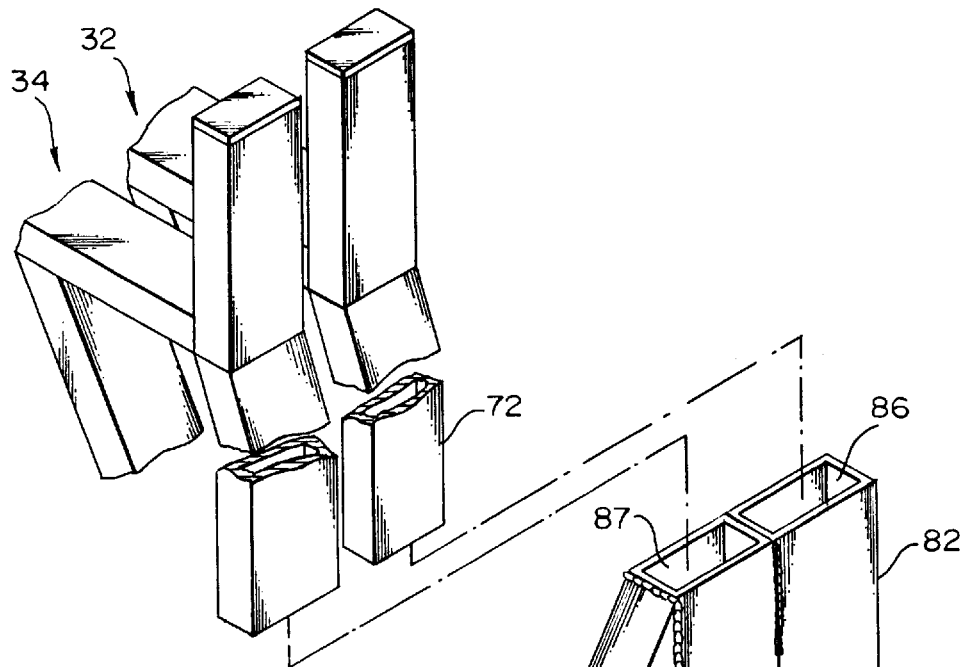
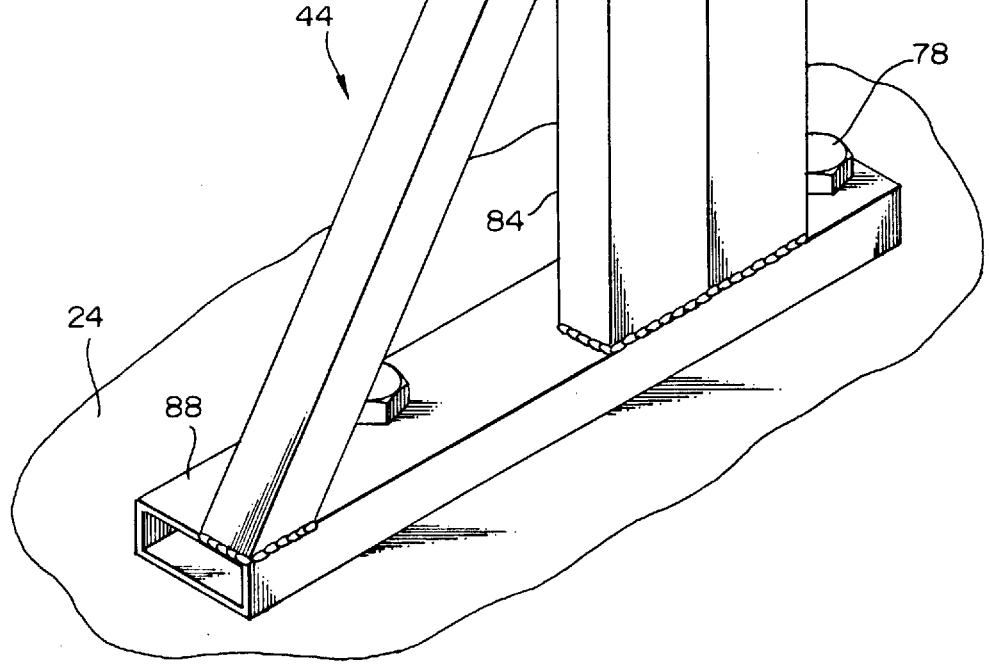
FIG. 2

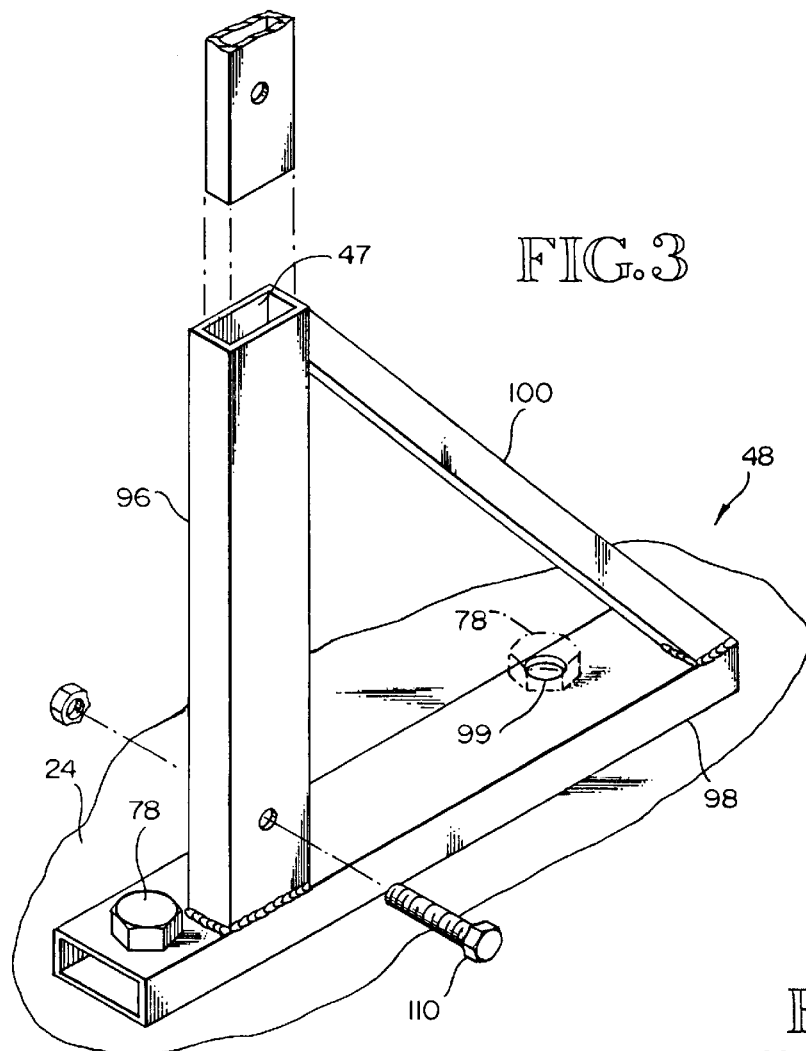
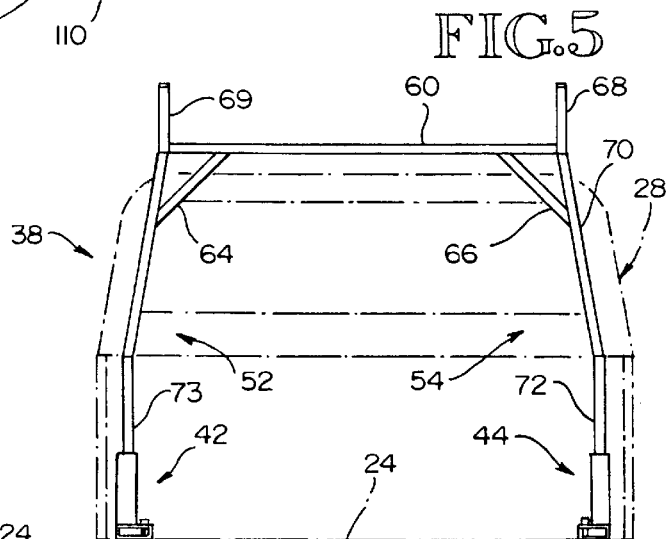
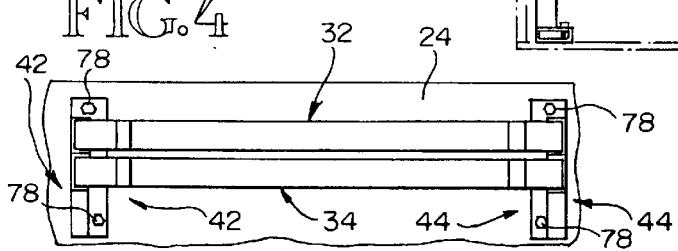

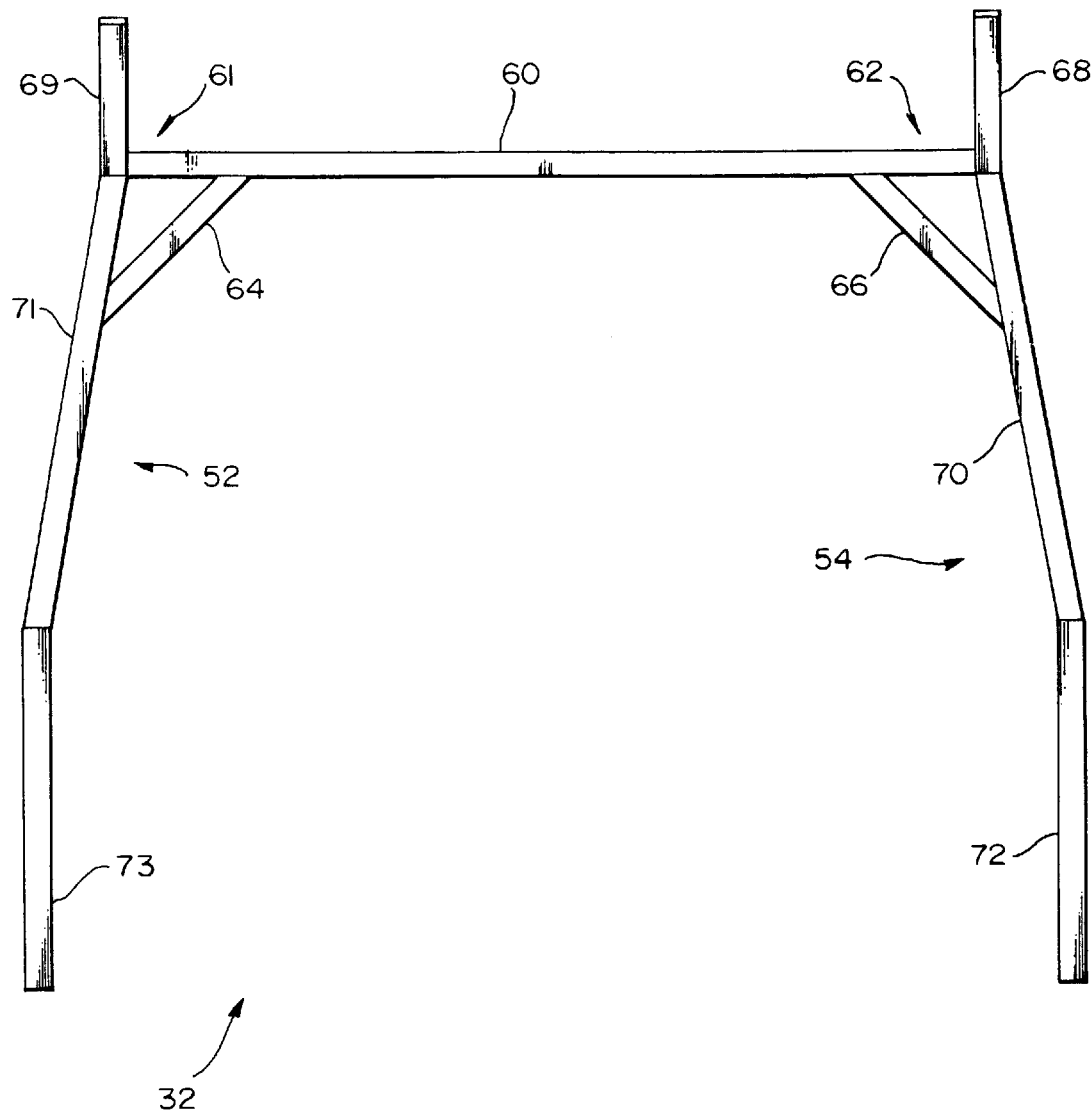

KNOCKDOWN TRUCK RACK APPARATUS AND METHOD

BACKGROUND OF THE INVENTION

This invention relates generally to elevated truck racks for installation over the cargo bed of a truck, and more particularly to those truck racks having components that knockdown and are removable for storage thereof when the rack is not in use.

Truck racks for supporting loads above the cargo bed of a truck, including pickup trucks, are well known in the art. The majority of such racks, however, require attachment to the sidewall adjacent the truck cargo bed which makes the rack difficult to remove when not in use. For example U.S. Pat. No. 4,152,020 issued to Brown et al. in 1979 shows a pickup truck rack with means for facilitating loading. The rack includes four corner posts supported on a steel angle bed that is bolted to the sidewalls of the pickup truck. Similarly, U.S. Pat. No. 4,278,175 issued to Jackson is 1981 illustrates a glass carrying rack that attaches to the sidewalls of a truck. Additionally, U.S. Pat. No. 4,199,186 issued to Faverino in 1980 showing a portable stock rack for pickup trucks that is primarily supported by the sidewalls thereof.

Later rack designs, however, started to incorporate removable/ movable components that facilitated easy removal thereof when the rack was not in use. However, like the earlier racks, they include portions that connect to the sidewall of the truck and depend on the same for support. For example U.S. Pat. No. 4,405,170 issued to Raya 1983 shows a demountable carrier rack having primary and secondary frameworks connected by running bars, and supported from the sidewalls of a pickup truck wherein the rear secondary framework is removably mounted thereto. Further, U.S. Pat. No. 4,770,458 issued to Burke in 1988 shows a truck rack having front and rear stanchions connected by side rails, wherein the rear stanchion is movable to a forward position adjacent the front stanchion. This design also includes portions thereof that connect to the sidewall of the truck.

For one reason or another, all of the above noted truck racks engage the sidewalls of a pickup truck. In addition, all of the noted truck racks require side rails that interconnect a front portion of the rack with a rear portion of the rack.

Accordingly, a need remains for a knockdown truck rack that is simple, inexpensive, constructed from a minimum number of components that are supported independent of the sidewalls of the truck, and that does not require members interconnecting front and rear portions thereof for stability or support.

SUMMARY

One object of the present invention is to minimize the space taken by a truck rack when it is not in use.

A second object is to construct a knockdown truck rack that is easily removed from the cargo bed of a truck and stored at some other convenient location when not in use.

Another object is to minimize the expense of constructing a truck rack.

Another object is to eliminate the need for a positive connection between the truck rack and the side walls of a pickup truck.

Yet another object is eliminate the need for side rails that interconnect front and rear frames of a truck rack.

A further object is to reduce the number of components required by a truck rack.

Still another object is to construct a truck rack that includes independent front and rear support frames that can be employed in flat bed trucks having no side walls.

The invention is knockdown truck rack adapted for attachment to the cargo bed of a truck for elevated support of materials and construction equipment, above the cargo bed. The knockdown truck rack comprises a front support frame that is movable from a stored position where the space above the cargo bed of the truck is substantially unobstructed, to a vertical set position over the truck cargo bed for supporting equipment in an elevated position adjacent the passenger cab of the truck. The front support frame includes a pair of laterally spaced, left and right, vertically oriented side-posts, and an elevated horizontal cross rail disposed therebetween. The opposite ends of the cross rail are rigidly connected, i.e., welded to each respective side-post.

Also included is an independently supported, rearwardly disposed, aft support frame that is movable from a stored position where the space above the cargo bed of the truck is substantially unobstructed, to a vertical set position over the truck cargo bed for supporting equipment in an elevated position. Like the front support frame, the aft support frame includes a pair of laterally spaced, left and right, vertically oriented side-posts, and an elevated horizontal cross rail disposed therebetween. Likewise the opposite ends of the cross rail are rigidly connected, i.e., welded to each respective side-post.

To maintain the support frames in the vertical set position four socket assemblies are provided to receive therein the side posts of the support frames. Included are a pair of laterally spaced, left and right front socket assemblies adapted for attachment to the cargo bed of the truck adjacent the passenger cab. The front socket assemblies are disposed to receive the corresponding left and right side-posts of the forward support frame to rigidly maintain the same in the vertical set position. Similarly, a pair of laterally spaced, left and right aft socket assemblies are provided for attachment to the cargo bed of a truck. The aft socket assemblies are disposed to receive the corresponding left and right side-posts of the aft support frame to rigidly maintain the aft support frame in the vertical set position. Finally, when the front and aft support frames are moved to their respective set positions, where the respective side posts are received into the socket assemblies, construction materials can then be moved onto the cross rails of the support frames.

The foregoing and other objects, features, and advantages of this invention will become more readily apparent to those skilled in this art from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 2 is a exploded fragmentary perspective view showing a front socket assembly having dual side-by-side socket sleeves disposed to receive the side-posts of front and aft support frames.

FIG. 3 is a fragmentary perspective view showing an aft socket assembly having a single socket sleeve disposed to receive the side-post of an aft support frame.

FIG. 4 is a fragmentary top plan view showing an aft support frame supported adjacently to a front support frame in a vertical set position by left and right front socket assemblies.

FIG. 5 is a rear elevational view of a knockdown truck rack disposed in the cargo bed of a pickup truck, with the truck being defined by phantom lines.

FIG. 6 is an elevational view of a typical support frame constructed in accordance with the p resent invention.

DETAILED DESCRIPTION OF PREFERRED EMBODIMENT

Figure 1:
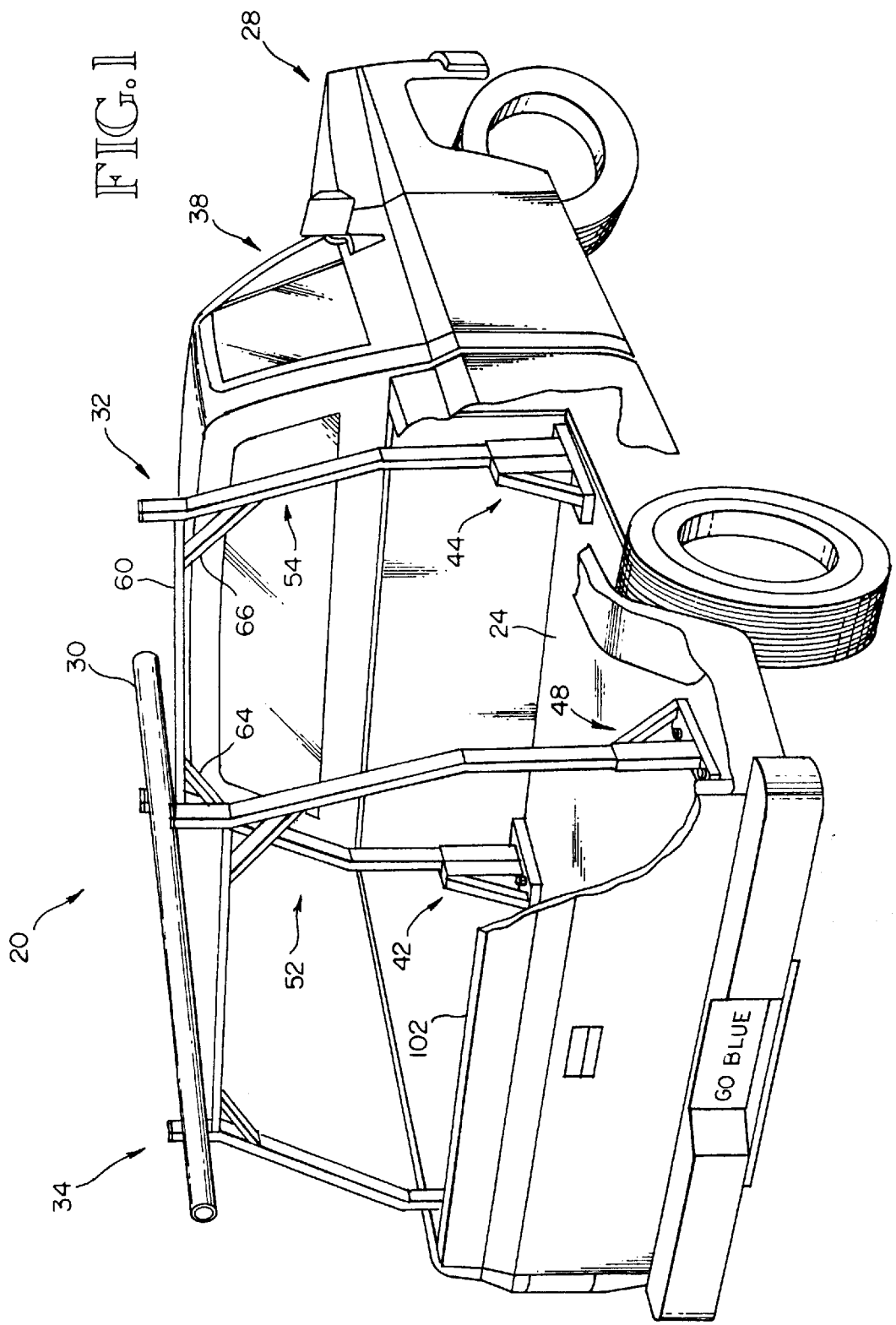
FIG. 1 is a perspective view taken from the rear of a truck having a knockdown truck rack installed therein with portions of the rear truck box broken away to show the independently disposed socket assemblies.

FIGS. 1 through 6 illustrate a knockdown truck rack 20 constructed in accordance with the present invention. The knockdown truck rack 20, hereinafter referred to as truck rack 20, is configured for mounting to the cargo bed 24 of a pickup truck 28. Further, the truck rack 20 is designed to withstand and resist forces imposed thereon without reliance on any connection to the side wall or cab of a pickup truck 28. It should be noted that a pickup truck 28 is shown in FIG. 1 only for illustrative purposes, and that the present invention would be suitable for use with any type of truck or vehicle having a flat surface or cargo bed.

Generally, the truck rack 20 is intended and designed for quick installation to the cargo bed 24 of a truck 28 when the driver/user requires the capability to carry long construction materials and tools that are best transported in an elevated position over the cargo bed 24; for example ladders, conduit and the like. Further, the truck rack 20 is constructed so that it can be easily disassembled, i.e., knocked down, and moved or stored in any suitable area.

Considering now in more detail the components from which a truck rack 20 is constructed, FIG. 1 illustrates a pair of substantially planar, spaced-apart support frames 32, 34 disposed over the truck cargo bed 24 for the support of equipment or materials such as a long pipe 30. Included therein is a front support frame 32 and an aft support frame 34. The front support frame 32 is disposed adjacent the passenger cab 38 of the truck 28. The aft support frame 34 is spaced rearward therefrom so that long objects such as a pipe 30 can have two spaced points of support above the truck cargo bed 24. Further, it should be appreciated that in the preferred embodiment, the front and aft support frames 32, 34 operate independently and are not connected in any way.

As will be more fully discussed below, the support frames 32, 34 are secured in an operative, erect and vertical set position, as illustrated in FIGS. 1, 4 and 5, when the same are received by four socket assemblies 42, 44, 46 and 48: one socket assembly for each side-post 52, 54 of each support frame 32, 34. Included therein is a left front socket assembly 42, a right front socket assembly 44, a left aft socket assembly 46, and a right aft socket assembly 48.

Attention is now directed to FIG. 6 wherein a front support frame 32 is illustrated. It should be noted that in the present invention, both the front support frame 32 and the aft support frame 34 are, in every respect, identical in construction and can therefore be interchanged. For this reason, only the components of the front support frame 32 will be discussed in detail. Included in front support frame 34 are the following primary components: laterally spaced apart, vertically oriented left and right side-posts 52, 54, a horizontal cross rail 60 that is rigidly connected at its ends, i.e., rail end 61 and rail end 62 to the side-posts 52, 54, and a pair of left and right brace members 64, 66. It should be understood that the left side-post 52, and the components thereof are a mirror image of the right side-post 54.

In the present invention, the preferred method of rigidly connecting these members is by welding the same at their respective connection points. The type of welds commonly employed include butt welds and fillet welds, however other types of welds could be suitably used. Further, it should be noted that other methods of rigidly connecting these members, not illustrated here, could be employed including bolts, rivets, and screws. Moreover, either support frame 32, 34 could be cast from a mold as a single unit.

In accordance with the present invention, each side-post 52, 54 is constructed from tubular steel, rectangular in cross section. The tubular steel side-posts 52, 54 are shaped, i.e., bent to a profile that follows the outline of the passenger cab 38 as best seen in FIG. 5. More specifically, the right side-post 54 is bent to define three segments: (A) an upper extension 68 that establishes an outer boundary and fence for the elevated cargo, (B) a central support section 70 that acts as a column to carry the weight of the elevated cargo, and (C) a male end 72 which is received into a socket assembly as will be discussed more fully below. Similarly, the "mirror image" left side-post 52 is bent to define three segments (A) an upper extension 69 that establishes an outer boundary and fence for the elevated cargo, (B) a central support section 71 that acts as a column to carry the weight of the elevated cargo, and (C) a male end 73 which is received into a socket assembly.

Additionally, it should be appreciated that both the front and aft support frames 32, 34 are substantially planar, wherein when the same are disposed in the vertical set position, they lie in a vertical plane oriented substantially normal to the truck cargo bed 24, and transverse to the longitudinal direction of the truck 28. Further, as illustrated in FIG. 6, a pair of brace members 64, 66 extend diagonally from a side-post 52, 54 to a cross rail 60. Each support frame 32, 34 includes a brace member 64 on the left and a brace member 66 on the right which stiffens the respective frame for rigidity against side loads, i.e., against sway in a direction transverse to the intended direction of travel of the truck 28.

Attention is now directed to FIGS. 1 through 5 for a more detailed description of socket assemblies 42, 44, and 46, 48. These socket assemblies are provided to receive the respective side-posts of the support frames 32, 34, and thereby maintain the same in the operative vertical set position. Left and right front socket assemblies 42, 44 are disposed on opposite sides of the truck cargo bed 24 adjacent the passenger cab 38. Similarly left and right aft socket assemblies 46, 48 are disposed on opposite sides of the truck cargo bed 24, but rearward from the passenger cab 38. Each socket assembly is arranged to receive the respective male end 72 or 73 of a side-post 54, 52. As will be more fully discussed below, the socket assemblies 42, 44, and 46, 48 are rigidly connected to the truck cargo bed 24 by a plurality of similarly sized bolts 78 or other suitable means such as welding (not illustrated). In this way, the socket assemblies maintain the support frames 32, 34 in a vertical set position, arranged to transfer the dynamic and static forces generated by cargo stowed upon the support frames.

Considering now in more detail left and right front socket assemblies 42–48, the front support frame 32 is maintained in the vertical set position by a front left socket assembly 42 and a laterally spaced apart front right socket assembly 44. Because each socket assembly 42, 44 is a mirror image of the other, only the components of the front right socket assembly 44, as illustrated in FIG. 2, will be discussed in detail. The socket assemblies 42, 44 are disposed adjacent the passenger cab 38, arranged to respectively receive the male ends 72, 73 of side-posts 52, 54 as shown in FIG. 5. To so receive the male ends 72, 73, each socket assembly 42, 44 includes means defining a receiving socket. In the preferred embodiment the socket means is a socket sleeve: the front right socket assembly 44 includes socket sleeve 82. In addition, each front socket assembly 42, 44 includes an additional adjacent parallel socket sleeve, which will be discussed more fully below, for receiving the aft support frame 34 and maintaining the same, adjacent the front support frame 32 in the vertical set position. The front right socket assembly 44 includes an additional parallel socket sleeve 84. Each socket sleeve 82, 84 is constructed from like tubular steel having a hollow interior portion that forms a receiving socket: socket sleeve 82 forms receiving socket 86, and socket sleeve 84 forms receiving socket 87. It should be noted that the interior size and dimensions of each receiving socket of each socket sleeve in the present invention noted above and hereinafter is identical. Accordingly, the side-posts of either support frame can be received by any socket assembly, thus the support frames 32, 34 are interchangeable.

The receiving sockets 86, 87 formed therein are of a size and shape to coaxially receive a respective male end of a side-post in close fitting relationship. In this way, the socket assemblies 42, 44 can securably maintain the front support frame 32 vertically in the operative vertical set position, yet also secure and maintain an aft support frame 34 adjacent thereto in the vertical set position.

The socket sleeves 82 and 84 are fixed, i.e., welded to a base plate 88 so that the same extend substantially vertically therefrom. The base plate 88 is similarly constructed from tubular steel. So that the socket sleeves 82, 84 can resist forces imparted to the support frames 32, 34 generated from acceleration or deceleration of the truck 28, a brace 92, also constructed from tubular steel, is provided to stiffen the socket sleeves 82, 84 in the longitudinal direction, i.e., the direction of travel of the truck 28 when it is moving straight ahead. The brace 92 is tubular in shape, and extends diagonally from the upper portion of socket sleeve 84 to the rear portion of the base plate 88. Because the brace 92 extends to the rear, the respective front socket assemblies 42, 44, and the socket sleeves thereof, can be attached to the truck cargo bed 24 in a location close to the passenger cab 38. The brace 92 is similarly welded at its end connection points to the socket sleeve 84 and to the base plate 88. As can be seen, the socket sleeves 82, 84 are externally braced. In this way, the receiving sockets thereof are unobstructed, and can therefore receive therein the respective male end of a side-post. It should be appreciated that socket sleeves 82, 84 could be braced in other ways including a triangular shaped gusset plate cut to fit between the base plate 88 and the vertical socket sleeves 82–84 (not illustrated).

Turning now to FIG. 3, a right aft socket assembly 48 is illustrated. Like the configuration of the front socket assemblies, a "mirror image" left aft socket assembly 46 is also provided. Because each left and right aft socket assemblies have corresponding components, only the right aft socket assembly 48 will be discussed in detail. The construction is very similar to the front socket assemblies 42, 44 wherein the components thereof consist primarily of tubular steel cut to proper length. Specifically, means defining a receiving socket, i.e., a socket sleeve 96 extends vertically from the rear portion of a base plate 98. The socket sleeve 96 includes a receiving socket 97 for receiving the male end of a side-post of an aft support frame 34. In addition, a brace 100 extends diagonally from the upper portion of the socket sleeve 96 to a forward portion of the base plate 98. With this configuration, the aft socket assemblies 46, 48 can be located close to the tailgate 102 of a pickup truck 28. Like the components of the front socket assemblies, the components of the aft socket assemblies are welded together. It should be appreciated that the aft socket assemblies comprise only one socket sleeve 96, and that a plurality of socket assemblies having this configuration could be properly positioned to receive each side-post of each support frame to maintain the same in the vertical set position.

Directing attention to FIGS. 2 through 4, it can be seen that a bolt 78 is provided through a pair of spaced apart holes furnished in each base plate 88, 98 of each socket assembly: for example, see hole 99 illustrated through the base plate 98 in FIG. 3 with phantom lines above indicating a bolt. Each bolt so provided extends through a corresponding hole (not illustrated) through the truck bed 24. In the preferred embodiment, each socket assembly includes one bolt disposed on the longitudinal center line, to the outside of a socket sleeve, i.e., between an end of the base plate and the socket sleeve. In addition, each socket assembly includes another bolt disposed adjacent the brace, but eccentric to the longitudinal center line as best seen in FIG. 4.

Turning again to FIG. 1, front and aft support frames 32, 34 are shown in the vertical set position, disposed to carry materials or the like. However, when the knockdown truck rack 20 is not in use, the user may remove and store the support frames thereby allowing one to utilize substantially the full cargo bed of the truck 28 for other purposes. Often, however, the user cannot predict when the knockdown truck rack 20 will be needed. For this situation, the parallel abutting and connected socket sleeves 82, 84 of the front socket assemblies 42, 44 are provided so that both support frames can be disposed side-by-side, adjacent the passenger cab 38 in the vertical set position. This is best illustrated in FIG. 4 which shows a plan view of side-by-side front and aft support frames 32, 34. Thus, the aft support frame 34 is movable from a vertical set position in the aft socket assemblies, to a vertical set position adjacent the passenger cab 38. In this way, the support frames are always available for use.

In another aspect of the invention, the support frames, disposed in the vertical set position, can be positively connected to the respective socket assembly to prevent the support frame from becoming inadvertently disconnected therefrom. For this purpose, a retaining pin 110 is provided. As best seen in FIG. 3, the retaining pin 110 is guided through a hole in the socket sleeve 96 of a socket assembly 48, and through a corresponding hole provided in the male end of a side-post. The retaining pin 110 is disposed entirely through the socket sleeve 96, and is then engaged by a nut or other means to keep the retaining pin 110 from working its way out. The retaining pin 110 can be employed with each socket sleeve thereby substantially locking the support frames in the respective socket assemblies.

It should be appreciated that the method of installing a knockdown truck rack 20 to the cargo bed 24 of a truck 28 is straight forward and requires only a few steps. Once the components thereof, as described in the foregoing, are provided, front and aft socket assemblies 42, 44, 46, and 48 are properly located over the cargo bed 24 and attached thereto with a plurality of bolts 78. The bolts being disposed through corresponding holes provided through the cargo bed 24. The front and aft support frames 32, 34 can then be moved to their respective set positions over the truck cargo bed 24.

In an alternate method of installation, the front and aft socket assemblies 42, 44, 46, 48 are disposed to receive a side-post of the respective support frame 32, 34. Then, while maintaining the same in the vertical set position, in the desired location over the cargo bed 24, the holes in the base plate can be used as a template for drilling corresponding holes through the cargo bed 24 of a truck 28. The socket assemblies can then secured thereto with a plurality of bolts 78. Thereafter, cargo and material can be supported on the cross rail 60 of the support frames.

Finally, it should noted that a knockdown truck rack 20 so installed is attached only to the cargo bed 24 of a truck 28. Further, no connection whatsoever is required to the side wall of a pickup truck, or to the passenger cab 38 thereof. This configuration is made possible by the brace members 64, 66 disposed in the support frames as well as the braces 92, 100 disposed in the front and aft socket assemblies 42, 44, 46 and 48.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. In a truck of the type having a flat cargo bed that extends rearward from a passenger cab, a knockdown truck rack adapted for attachment to the cargo bed for elevated support of materials and construction equipment, above the cargo bed, the knockdown truck rack comprising:

a front support frame that is movable from a stored position where the space above the cargo bed of the truck is substantially unobstructed, to a vertical set position over the truck cargo bed for supporting equipment in an elevated position adjacent the passenger cab of the truck, said front support frame having a pair of laterally spaced, left and right, vertically oriented side-posts, and an elevated horizontal cross rail disposed therebetween, wherein each side-post is attached to opposite ends of the cross rail;

an independent, rearwardly disposed, aft support frame that is movable from a stored position where the space above the cargo bed of the truck is substantially unobstructed, to a vertical set position over the truck cargo bed for supporting equipment in an elevated position, said aft support frame having a pair of laterally spaced, left and right, vertically oriented side-posts, and an elevated horizontal cross rail disposed therebetween, wherein each side-post is attached to opposite ends of the cross rail;

a pair of laterally spaced, left and right front socket assemblies for attachment to the cargo bed of a truck adjacent the passenger cab, said front socket assemblies being disposed to receive corresponding said left and right side-posts of the front support frame to rigidly maintain the front support frame in the vertical set position;

a pair of laterally spaced, left and right aft socket assemblies for attachment to the cargo bed of a truck, said aft socket assemblies being disposed to receive corresponding said left and right side-posts of the aft support frame to rigidly maintain the aft support frame in the vertical set position;

each said front and aft socket assemblies further comprising a base plate for mounting to the cargo bed of the truck, and a tubular socket sleeve defining a receiving socket of the size and shape to receive therein the corresponding side-post of the corresponding support frame, each socket sleeve being fixed to the corresponding base plate, and extending vertically therefrom;

each said front and aft socket assemblies further comprising a brace disposed between the base plate and the socket sleeve for reinforcing and maintaining the respective socket sleeve in vertical relationship to its corresponding base plate, each said brace being fixedly connected to its respective base plate and to its respective socket sleeve; and each front socket assembly further comprising an additional adjacently disposed parallel socket sleeve for receiving the side-post of an aft support frame, said adjacent parallel socket sleeves being connected, each to the other, wherein the aft support frame is movable to a vertical set position adjacent the front support frame.

2. A knockdown truck rack as recited in claim 1 wherein the brace is defined by an elongate tubular member that extends upward from the base plate to the socket sleeve, wherein one end of the brace is fixed to the base plate, and the opposite end is fixed to the socket sleeve.

3. In a truck of the type having a flat cargo bed that extends rearward from a passenger cab, a knockdown truck rack adapted for attachment to the cargo bed for elevated support of materials and construction equipment, above the cargo bed, the knockdown truck rack comprising:

a front support frame that is movable from a stored position where the space above the cargo bed of the truck is substantially unobstructed, to a vertical set position over the truck cargo bed for supporting equipment in an elevated position adjacent the passenger cab of the truck, said front support frame having a pair of laterally spaced, left and right, vertically oriented side-posts, and an elevated horizontal cross rail disposed therebetween, wherein each side-post is attached to opposite ends of the cross rail;

an independent, rearwardly disposed, aft support frame that is movable from a stored position where the space above the cargo bed of the truck is substantially unobstructed, to a vertical set position over the truck cargo bed for supporting equipment in an elevated position, said aft support frame having a pair of laterally spaced, left and right, vertically oriented side-posts, and an elevated horizontal cross rail disposed therebetween, wherein each side-post is attached to opposite ends of the cross rail;

a pair of laterally spaced, left and right front socket assemblies for attachment to the cargo bed of a truck adjacent the passenger cab, said front socket assemblies being disposed to receive corresponding said left and right side-posts of the front support frame to rigidly maintain the front support frame in the vertical set position;

a pair of laterally spaced, left and right aft socket assemblies for attachment to the cargo bed of a truck, said aft socket assemblies being disposed to receive corresponding said left and right side-posts of the aft support frame to rigidly maintain the aft support frame in the vertical set position;

each said front and aft socket assemblies further comprising a base plate for mounting to the cargo bed of the truck, and a tubular socket sleeve defining a receiving socket of the size and shape to receive therein the corresponding side-post of the corresponding support frame, each socket sleeve being fixed to the corresponding base plate, and extending vertically therefrom; and each front socket assembly further comprising an additional adjacently disposed parallel socket sleeve for receiving the side-post of an aft support frame, said adjacent parallel socket sleeves being connected, each to the other, wherein the aft support frame is movable to a vertical set position adjacent the front support frame.

* * * * *